United States Patent
Ludwig

(10) Patent No.: US 10,436,376 B2
(45) Date of Patent: Oct. 8, 2019

(54) THREAD PROTECTOR

(71) Applicant: TEXAS INTERNATIONAL OILFIELD TOOLS, LTD., Houston, TX (US)

(72) Inventor: Darcy Ludwig, Red Deer (CA)

(73) Assignee: Texas International Oilfield Tools, Ltd., Houston, TX (US)

( * ) Notice: Subject to any disclaimer, the term of this patent is extended or adjusted under 35 U.S.C. 154(b) by 0 days.

(21) Appl. No.: 15/657,026

(22) Filed: Jul. 21, 2017

(65) Prior Publication Data

US 2018/0023748 A1    Jan. 25, 2018

Related U.S. Application Data

(60) Provisional application No. 62/365,876, filed on Jul. 22, 2016.

(51) Int. Cl.
| | | |
|---|---|---|
| *F16L 57/00* | (2006.01) | |
| *B65D 59/06* | (2006.01) | |
| *F16L 15/00* | (2006.01) | |

(52) U.S. Cl.
CPC ............ *F16L 57/005* (2013.01); *B65D 59/06* (2013.01); *F16L 15/006* (2013.01)

(58) Field of Classification Search
CPC .............................. F16L 57/005; F16L 15/006
USPC ....... 138/96 R, 96 T, 89; 220/796, 806, 235, 220/233
See application file for complete search history.

(56) References Cited

U.S. PATENT DOCUMENTS

| | | | | |
|---|---|---|---|---|
| 1,708,657 A | * | 4/1929 | Brown ................. | B65D 59/02 102/528 |
| 1,711,181 A | * | 4/1929 | Shrum .................. | B65D 59/06 138/96 T |
| 2,082,286 A | * | 6/1937 | Gunderman ......... | B65D 59/06 138/96 T |
| 3,858,613 A | * | 1/1975 | Musslewhite ........ | B65D 59/06 138/96 T |
| 3,923,192 A | * | 12/1975 | Walters ............... | B65D 39/082 220/235 |

(Continued)

FOREIGN PATENT DOCUMENTS

| | | |
|---|---|---|
| CA | 2974057 | 1/2018 |
| WO | 2004063025 | 7/2004 |

OTHER PUBLICATIONS

PCT/US2017/043567—related PCT International Search Report (dated Oct. 16, 2017) 3 pages.

(Continued)

*Primary Examiner* — Patrick F Brinson
(74) *Attorney, Agent, or Firm* — Gordon G. Waggett, P.C.

(57) ABSTRACT

A thread protector for use with a threaded end of a tubular member comprises a first end having an opening with an inside diameter, a second end, and an interior having an inside diameter that is substantially the same as the inside diameter of the opening. The interior is adapted to accept and surround the threaded end. The thread protector may be actuated between a locked and an unlocked configuration. When the thread protector is in the locked configuration, a portion of the inside diameter is reduced, as compared to when the thread protector is in the unlocked configuration, so as to securely mount the thread protector to the threaded end.

7 Claims, 29 Drawing Sheets

(56) References Cited

U.S. PATENT DOCUMENTS

| | | | |
|---|---|---|---|
| 4,394,916 A | | 7/1983 | Smalley |
| 4,616,679 A | * | 10/1986 | Benton ................ F16L 57/005 |
| | | | 138/96 R |
| 4,655,256 A | * | 4/1987 | Lasota .................. B65D 59/02 |
| | | | 138/96 T |
| 5,197,616 A | | 3/1993 | Buono |
| 5,524,672 A | * | 6/1996 | Mosing ................ B65D 59/00 |
| | | | 138/110 |
| 5,819,805 A | * | 10/1998 | Mosing ................ B65D 59/00 |
| | | | 138/96 T |
| 6,367,508 B1 | * | 4/2002 | Richards ............... B65D 59/02 |
| | | | 138/96 R |
| 10,139,032 B2 | | 11/2018 | Ludwig |
| 2014/0261849 A1 | | 9/2014 | Danneffel et al. |
| 2015/0344193 A1 | | 12/2015 | Piscopo |

OTHER PUBLICATIONS

PCT/US2017/043567—related PCT Written Opinion (dated Oct. 16, 2017) 3 pages.

Ludwig, Darcy, related U.S. Appl. No. 15/658,359 Notice of Allowance and Notice of References Cited (dated Jul. 19, 2018) 10 pages.

\* cited by examiner

LOCKED POSITION

SECTION C-C

SECTION K-K

SECTION M-M

ABSTRACT LINE OMITTED

THREAD PROTECTOR

CROSS REFERENCE TO RELATED APPLICATION

This application is a regular application of U.S. Provisional Patent Application Ser. No. 62/365,876 filed Jul. 22, 2016 and entitled, "THREAD PROTECTOR", the entirety of which is incorporated herein by reference.

FIELD OF THE INVENTION

The field of present invention relates generally to devices for protecting the threaded ends of elements such as pipes or tubular members and, more particularly, to an improved device of this kind that is of simpler design, weather resistant, and quicker to mount onto, and unmount off of, such tubular member's threaded ends.

BACKGROUND OF THE INVENTION

The background information discussed below is presented to better illustrate the novelty and usefulness of the present invention. This background information is not admitted prior art.

Oil and gas well drilling operations typically use a plurality of connected, jointed drill pipes with a drill bit attached at one end. Drill pipe, drillpipe or drillstem comes in a variety of sizes, strengths, and weights but are typically 30 to 33 feet in length. Drill pipe is comprised of tubular steel conduit fitted with special threaded ends called tool joints. These threaded ends may be externally or internally threaded. Similarly, tubular members such as drill casing also have internally and externally threaded ends. Both types of threaded ends must be protected from damage, deformations, and soiling.

During oil and gas well drilling operations, tubular members are often exposed to rough manipulation and storage conditions. Tubular members are often stored in wet and dirty conditions. Tubular members are usually manipulated using hydraulic pipe moving apparatus, where a carriage or skate imparts significant forces onto a tubular member's threaded end, so as to move that tubular member along a trough to a desired location.

Conventional thread protectors normally comprise a clamp-on mechanism or a lock-pin mechanism to secure the thread protector onto the tubular member's threaded end. These clamp-on and lock-pin mechanisms employ stainless steel or other metallic springs, clamps and pins. While convenient in terms of securing or removing a thread protector onto or off of a threaded end, the metallic and steel components of these conventional mechanisms are often damaged during use. Such damage is usually due to exposure to the elements and/or due to the forces and vibrations from the carriage or skate of a hydraulic pipe moving apparatus.

Therefore, what is needed is a simple, cost-effective thread protector that is weather resistant, simple in design and that does not require steel or other metallic components to lock or unlock the protector onto, or off of, a threaded end.

SUMMARY OF THE INVENTION

In an embodiment of the invention, there is provided a thread protector for use with a threaded end of a tubular member, the threaded end having an outside diameter. The thread protector comprises a first end having an opening with an inside diameter, a second end, and an interior having an inside diameter that is substantially the same as the inside diameter of the opening. The interior is adapted to accept and surround at least a portion of the threaded end. The thread protector may be actuated between a locked configuration and an unlocked configuration. When the thread protector is in the locked configuration, at least a portion of the inside diameter of the interior is reduced so as to become smaller, as compared to when the thread protector is in the unlocked configuration. When the thread protector is in the locked configuration, the inside diameter of the interior is reduced so as to securely mount the thread protector to the threaded end.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF THE PREFERRED EMBODIMENTS

Figure 1:
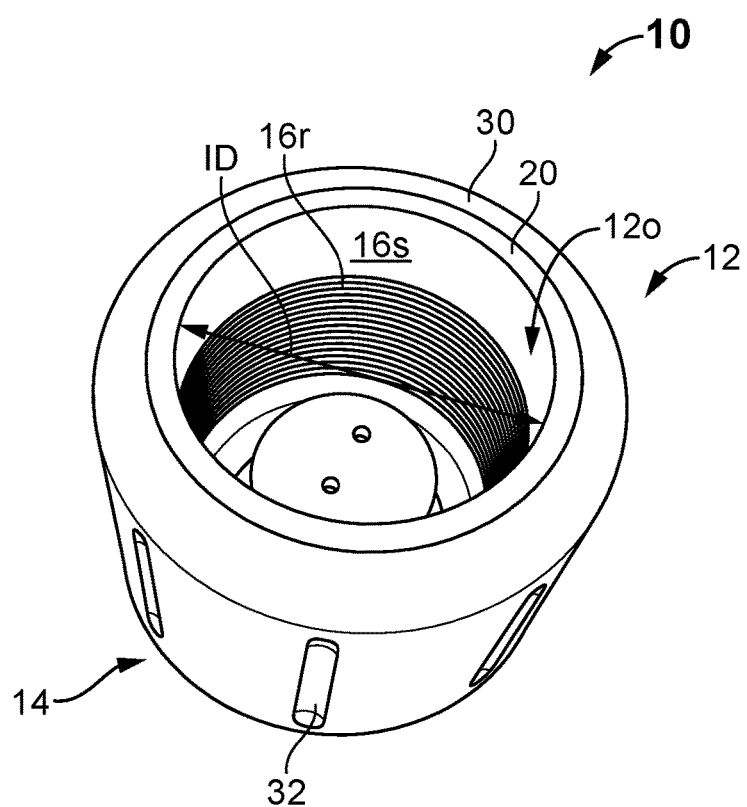
FIG. 1 is a perspective view of a first embodiment of the thread protector of the present invention.
Figure 2:
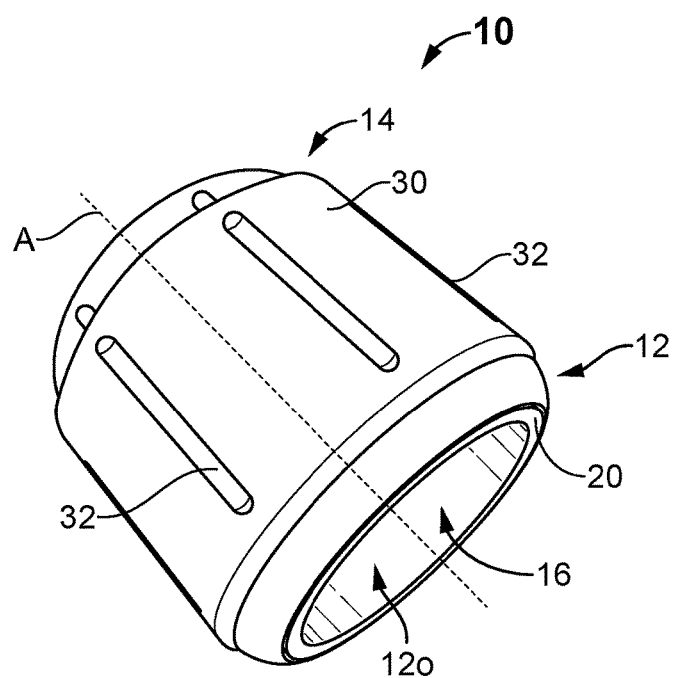
FIG. 2 is a second perspective view of the thread protector of the embodiment of FIG. 1.
Figure 3:
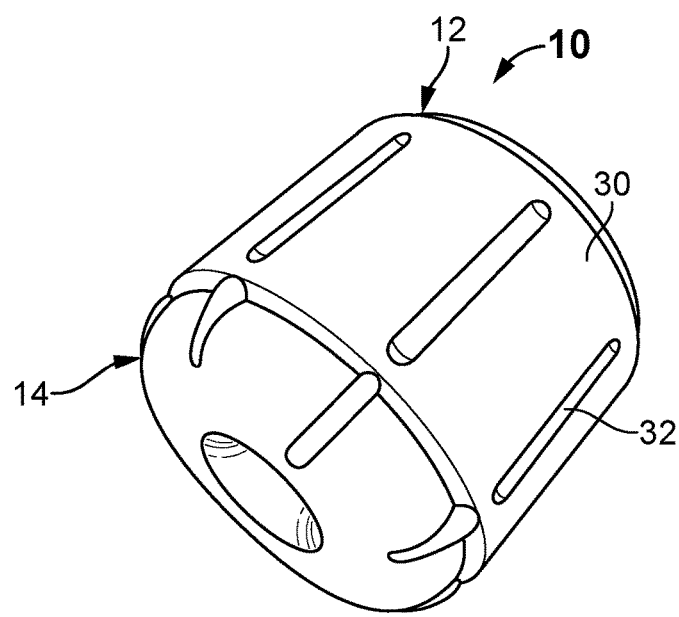
FIG. 3 is a third perspective view of the thread protector of the embodiment of FIG. 1.
Figure 4:
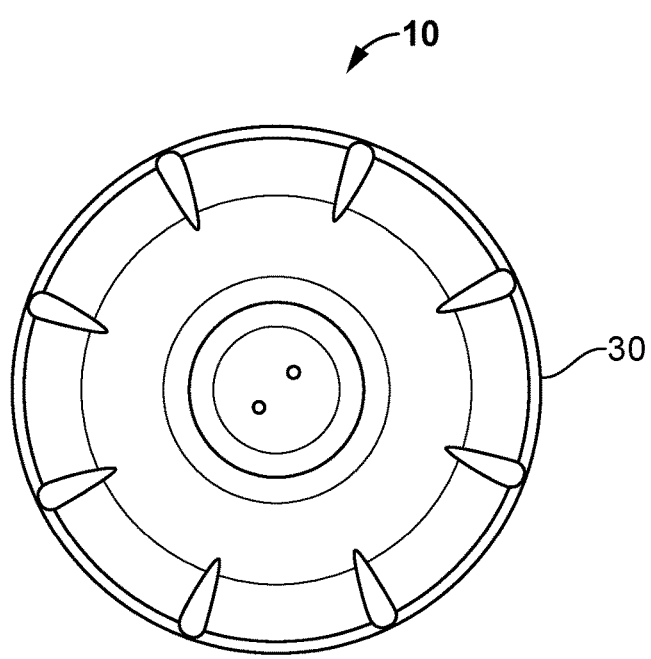
FIG. 4 is a fourth perspective view of the thread protector of the embodiment of FIG. 1.
Figure 5:
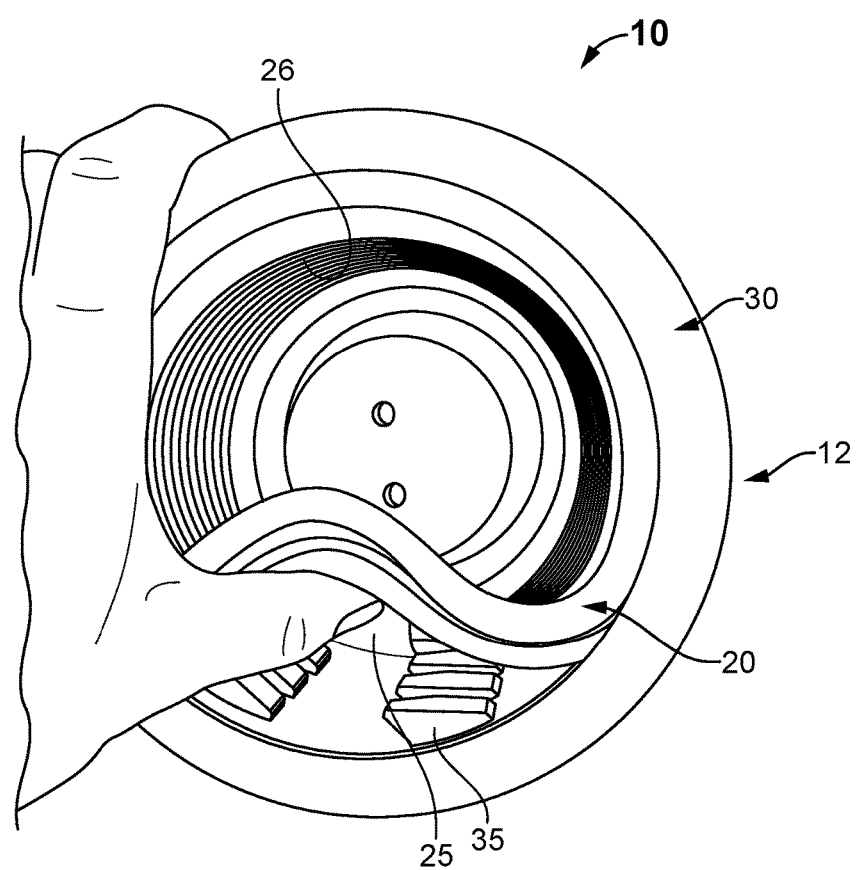
FIG. 5 is a fifth perspective view of the thread protector of the embodiment of FIG. 1, showing the inner member being deflected to reveal the interior structure of the outer member.
Figure 6:
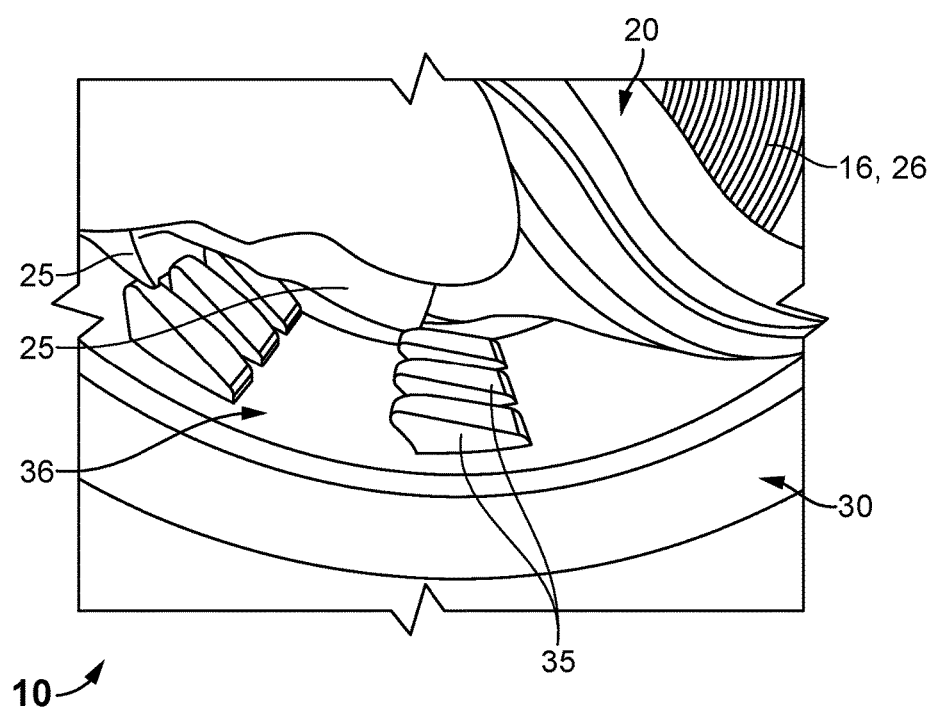
FIG. 6 is a sixth perspective view of the thread protector of the embodiment of FIG. 1, showing the inner member being deflected to reveal the interior structure of the outer member.
Figure 7:
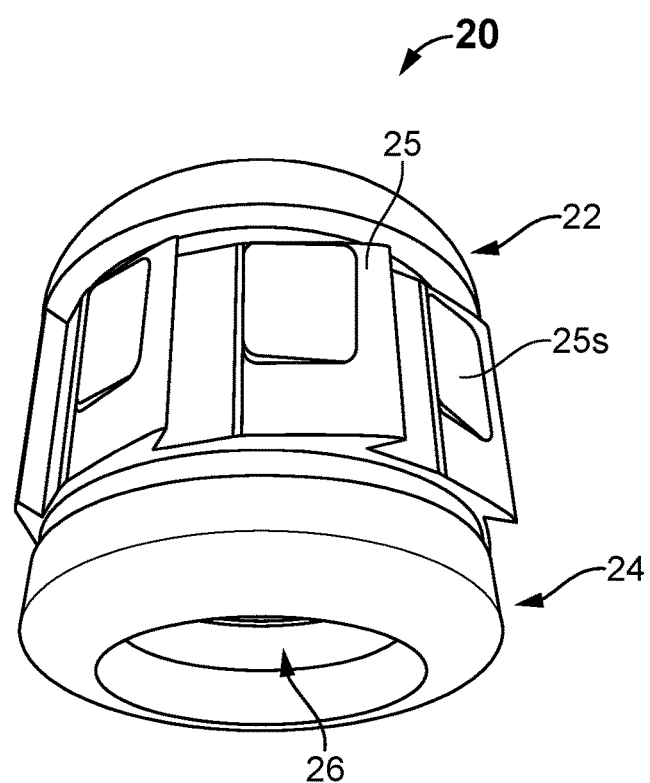
FIGS. 7 and 8 are perspective views of the inner member of the thread protector of the embodiment of FIG. 1.
Figure 8:
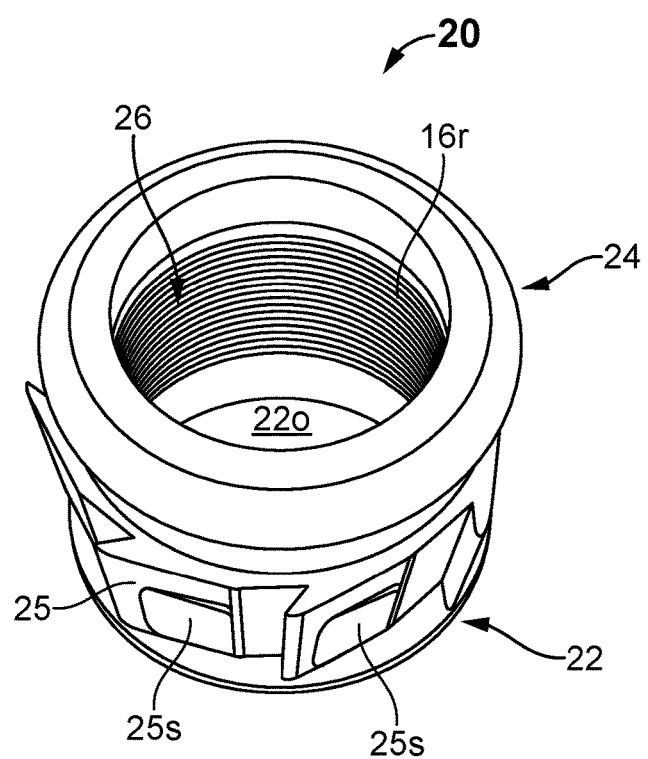

The following description is of preferred embodiments by way of example only and without limitation to the combination of features necessary for carrying the invention into effect. Reference is to be had to the Figures in which identical reference numbers identify similar components. The drawing figures are not necessarily to scale (except where specifically indicated) and certain features may be shown in schematic or diagrammatic form in the interest of clarity and conciseness.

FIGS. 1-10 show a first preferred embodiment of a thread protector 10 suitable for mounting onto, and off of, a threaded end TR of a tubular member T having an outside diameter OD. FIGS. 11-21 show a second embodiment of a thread protector 10. FIGS. 22-29 show a third embodiment of a thread protector 10.

For tubular members such as casing string, specification 5C3 of the American Petroleum Institute (API) standardizes a number of casing sizes ranging from 4.5 inches (11.43 cm) to 20 inches (50.80 cm) outside diameter OD. The threaded end TR of such a casing string tubular T will usually also feature a slight conical shape or taper to a slightly smaller diameter than the outside OD diameter of the tubular member T.

Figure 9:
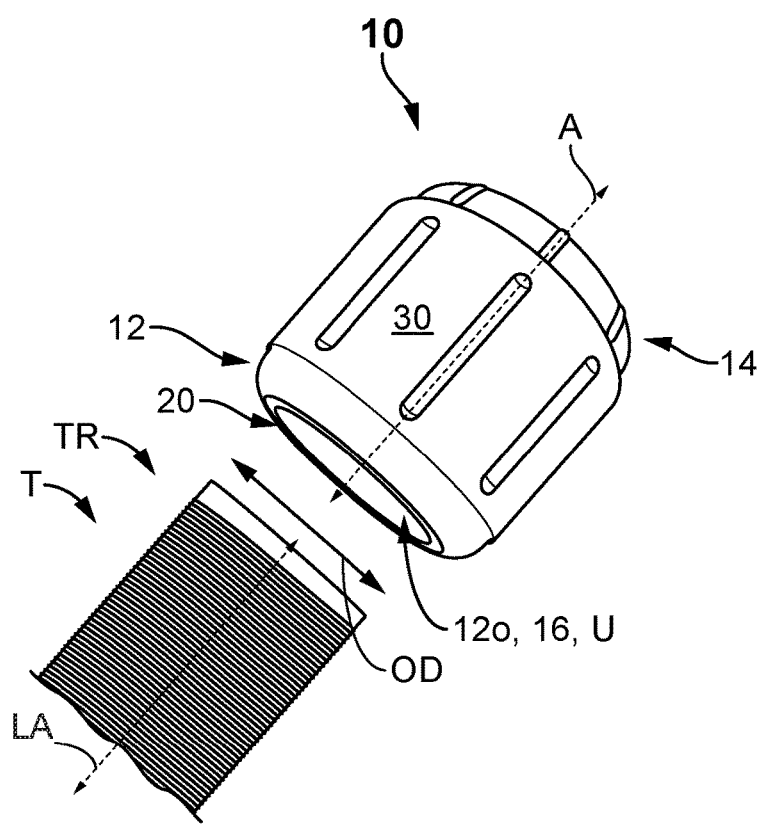
FIG. 9 is a perspective view of the thread protector of the embodiment of FIG. 1, shown adjacent a threaded end of a tubular member.
Figure 10:
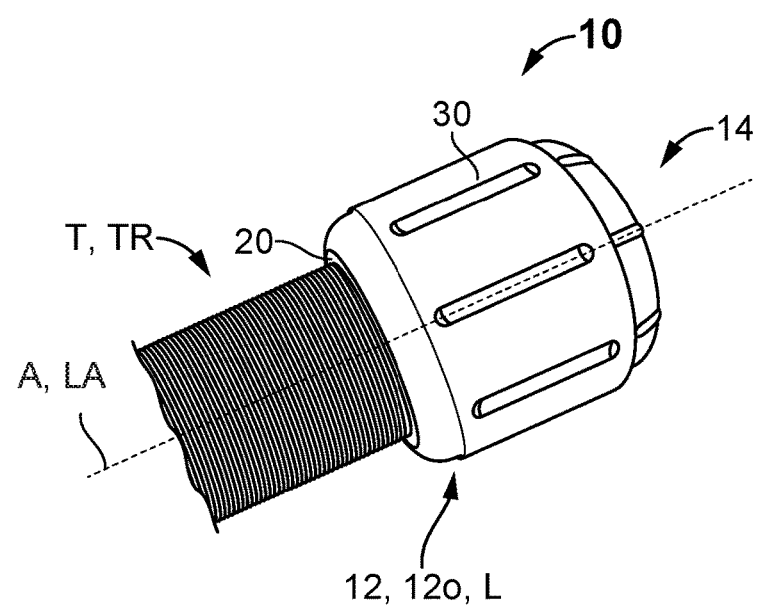
FIG. 10 is a perspective view of the thread protector of the embodiment of FIG. 1, shown mounted on a threaded end of a tubular member.

The thread protector 10 is preferably a generally hollow cylindrical member, or a generally annular sleeve-like member, having a first end 12, a second end 14 and an interior 16 adapted to accept and surround at least part of a threaded end TR of a tubular member; as illustrated in FIGS. 9 and 10. The thread protector may be actuated, positioned, rotated R or moved between a locked L and an unlocked U configuration (see FIGS. 11 and 12).

When in the unlocked configuration U, the first end 12 comprises an opening 12o to accept threaded end TR therethrough and into the interior 16. Preferably, opening 12o and interior 16 have a generally circular cross-section and an inside diameter ID to substantially match the outside diameter OD of the tubular member (see FIGS. 9 and 11). More preferably, opening 12o and interior 16 are of such size and dimensions to slidably and snuggly accept the threaded end TR, when in the unlocked configuration U.

Figure 12:
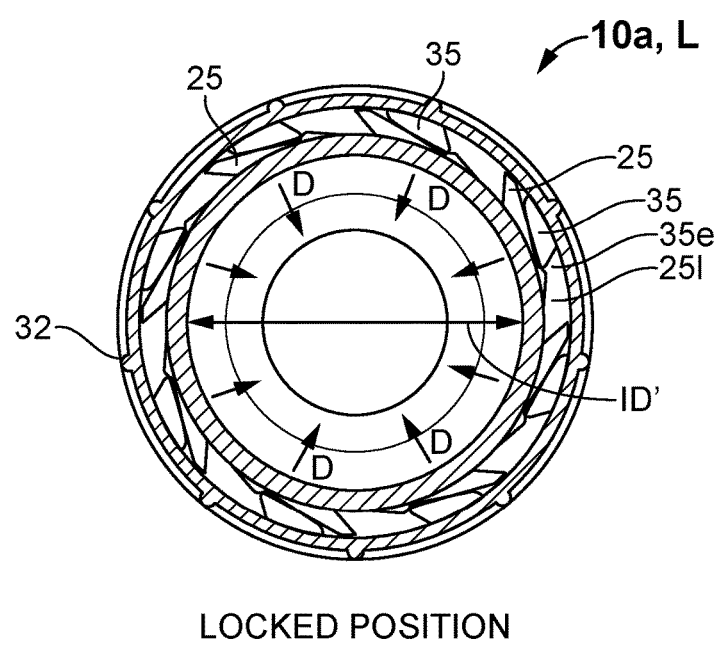
Figure 13:
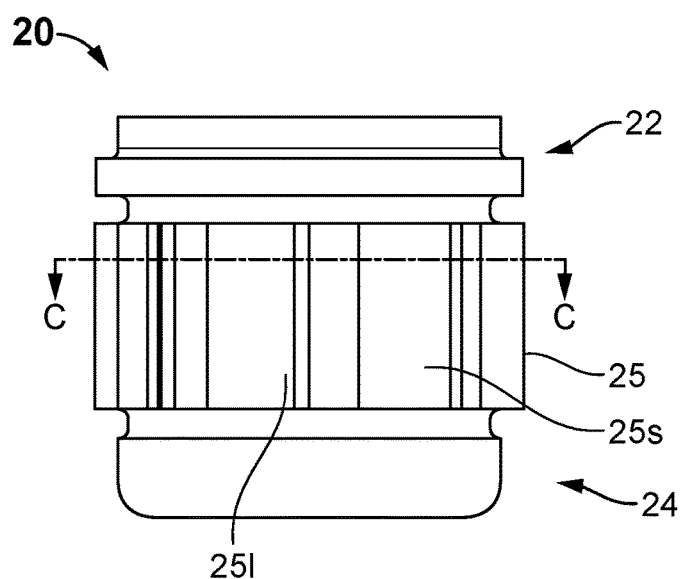
FIG. 13 is a side view of the inner member of the thread protector of the embodiment of FIG. 11.
Figure 14:
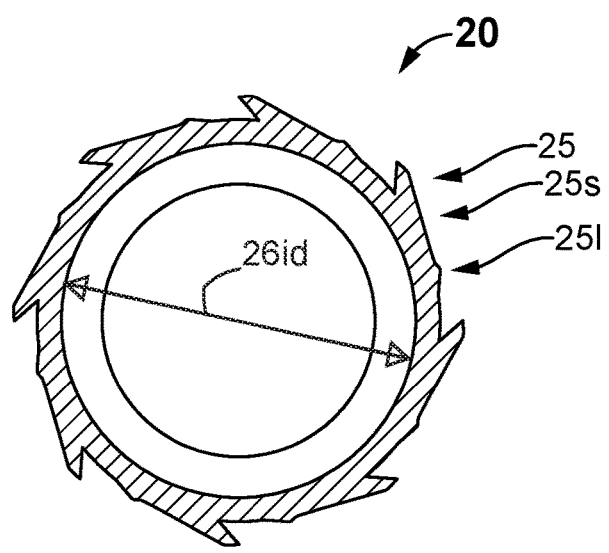
FIG. 14 is a sectioned view of the inner member of FIG. 13 taken along line C-C.
Figure 15:
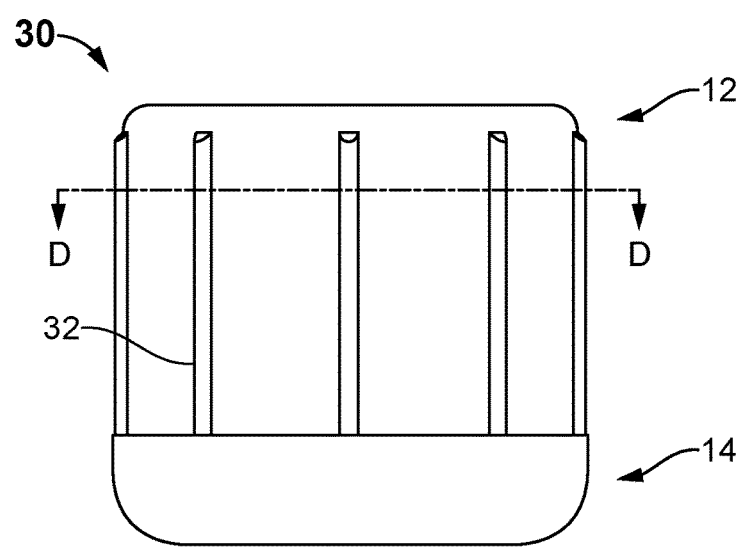
FIG. 15 is a side view of the outer member of the thread protector of the embodiment of FIG. 11.
Figure 16:
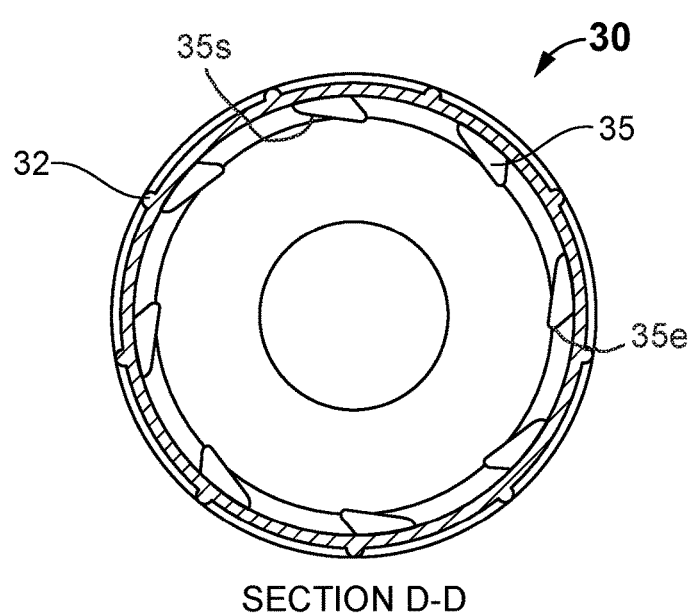
FIG. 16 is a sectioned view of the outer member of FIG. 15 taken along line D-D.
Figure 17:
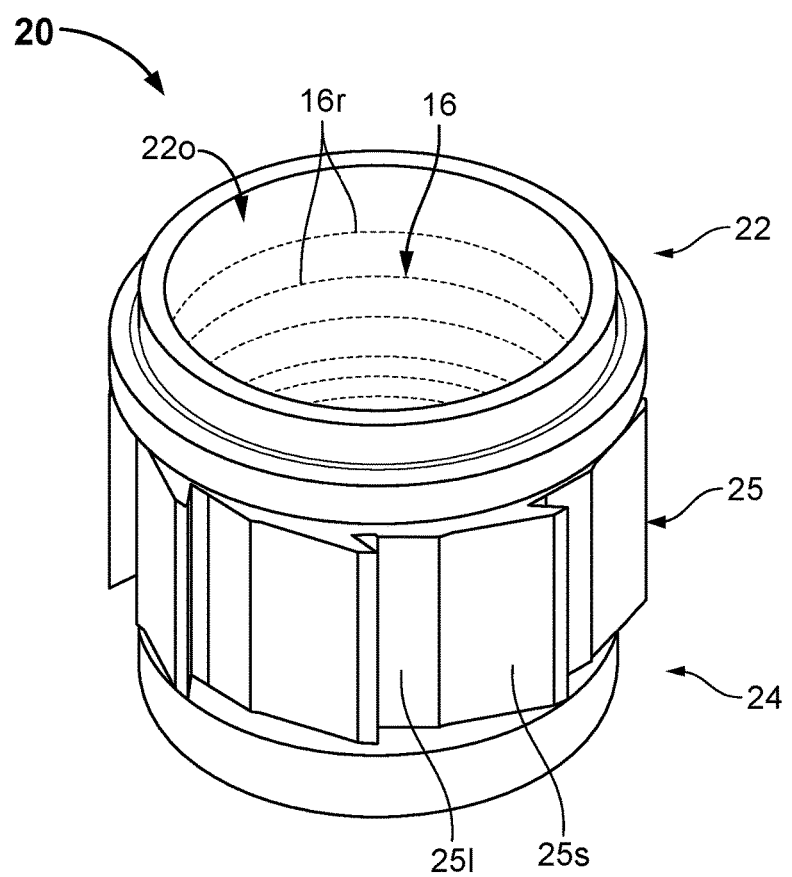
FIG. 17 is a perspective view of the inner member of the thread protector of the embodiment of FIG. 11.
Figure 18:
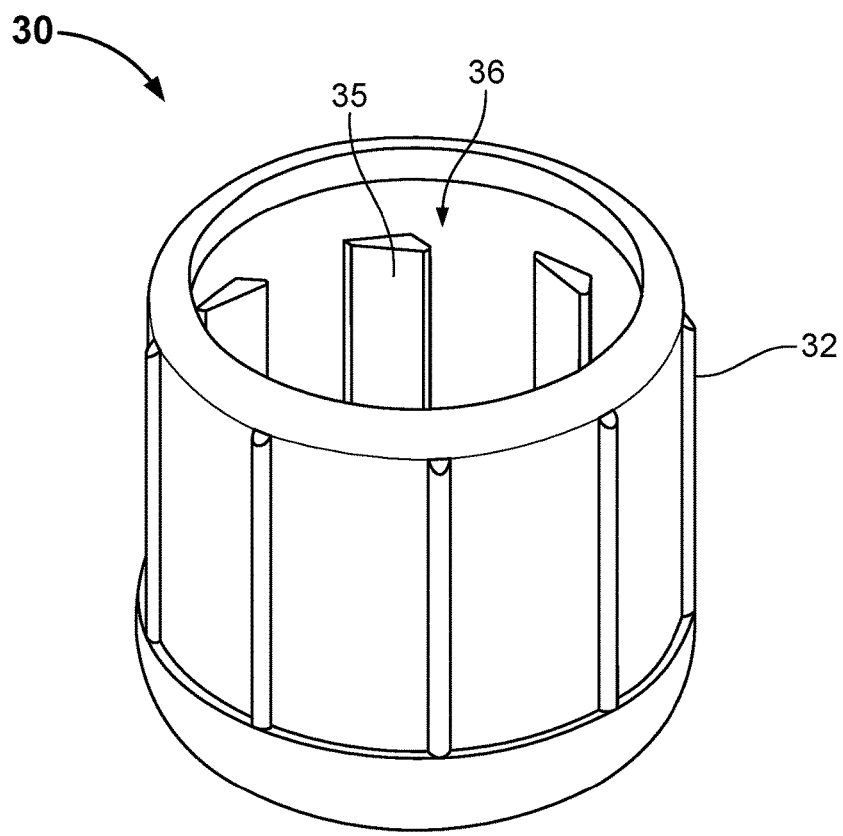
FIG. 18 is a perspective view of the outer member of the thread protector of the embodiment of FIG. 11.
Figure 19:
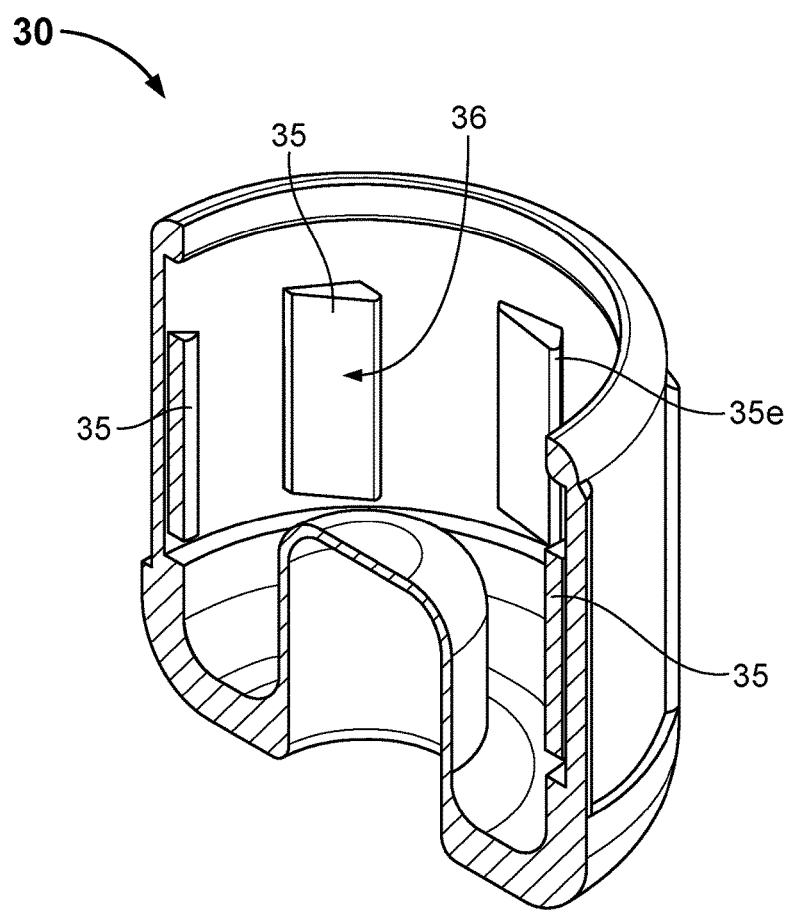
FIG. 19 is a sectioned perspective view of the outer member of the thread protector of the embodiment of FIG. 11.

When in the locked configuration L, the size, dimensions and inside diameter ID' of the opening 12o and interior 16 are reduced (as compared to the inside diameter ID when in the unlocked configuration) so as to securely grip the threaded end TR via a friction fit and securely mount the thread protector 10 to that threaded end TR (see FIGS. 10 and 12). As will now be clear to those skilled in the art, the inside diameter ID of the opening 12o and interior 16 changes in size as the thread protector 10 is moved or rotated R between the locked L and unlocked U configurations, with the inside diameter ID' of the locked configuration decreasing D and being smaller than the inside diameter ID of the unlocked configuration, and also being smaller than the outside diameter OD of the tubular member T.

Figure 20:
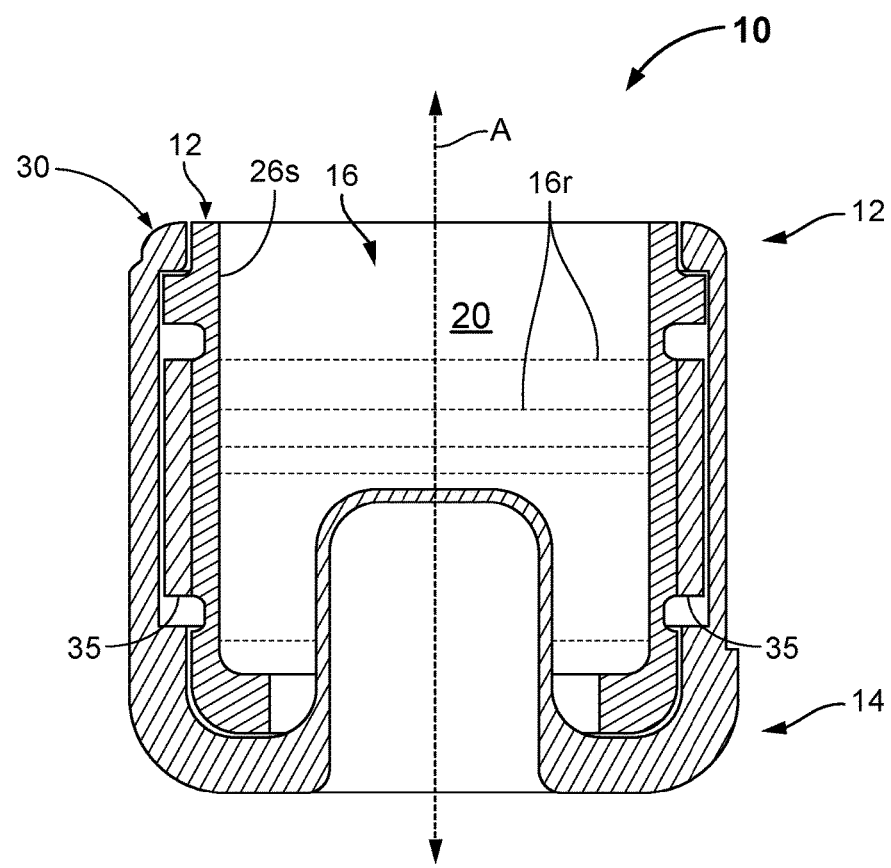
FIG. 20 is a sectioned side view of the thread protector of the embodiment of FIG. 11.
Figure 21:
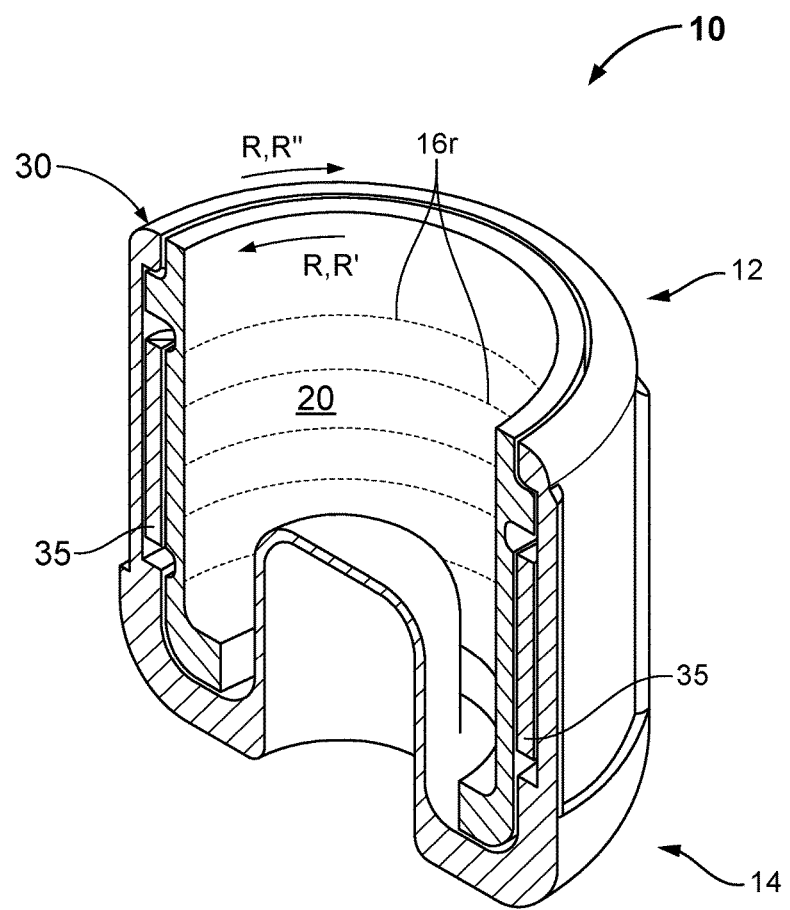
FIG. 21 is a sectioned perspective view of the thread protector of the embodiment of FIG. 11.
Figure 22:
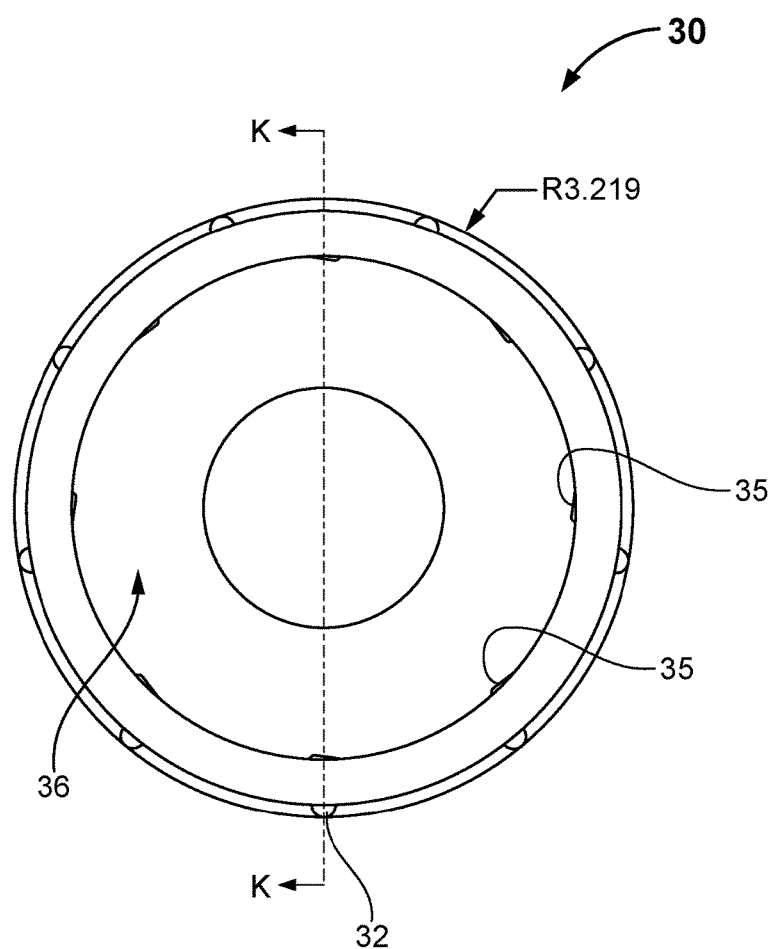
FIG. 22 is an end view of an outer member of a third embodiment of the thread protector of the present invention, showing preferred dimensions (in inches) suitable for placement of this embodiment onto a 4.5 inch outside diameter tubular member (not shown)
Figure 23:
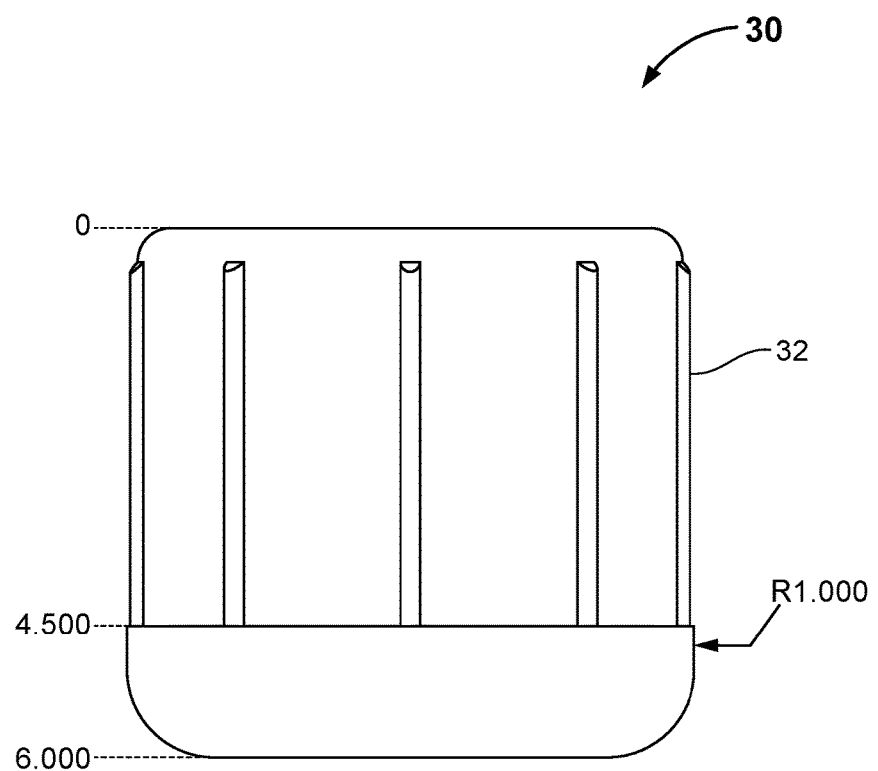
FIG. 23 is a side view of the outer member of the embodiment of FIG. 22.
Figure 24:
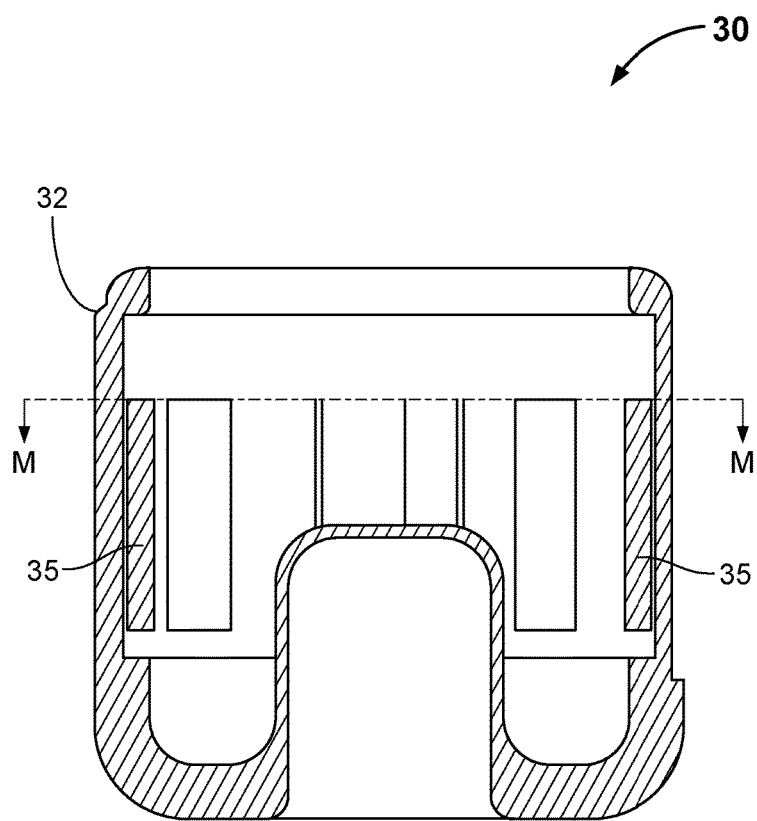
FIG. 24 is a sectioned view of the outer member of the embodiment of FIG. 22, taken along line K-K.
Figure 25:
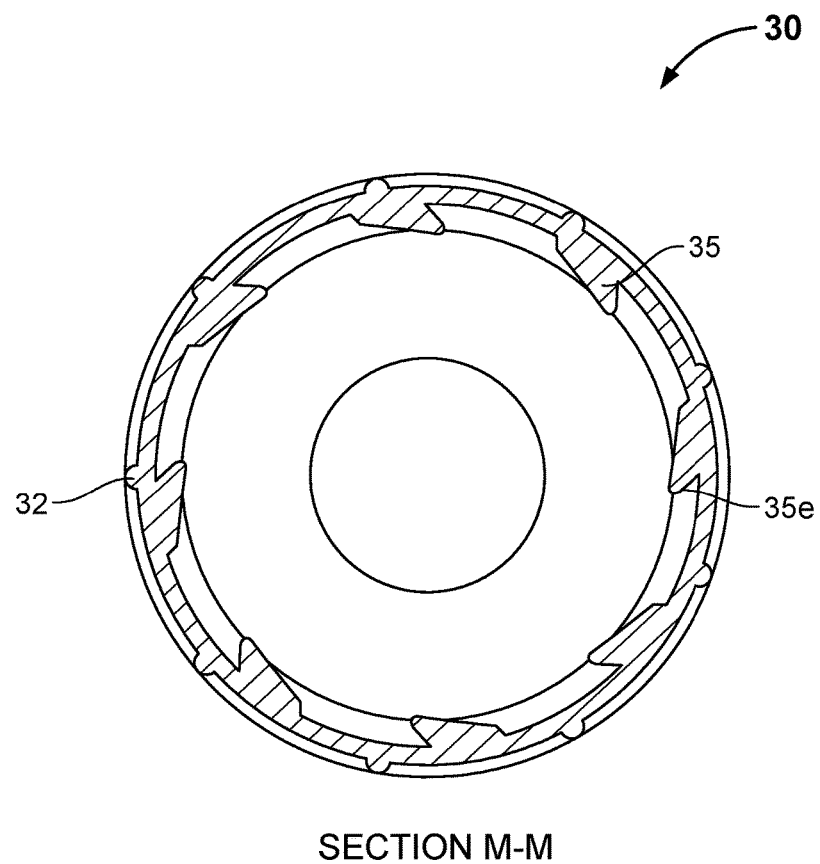
FIG. 25 is a sectioned view of the outer member of the embodiment of FIG. 22, taken along line M-M of FIG. 24.
Figure 26:
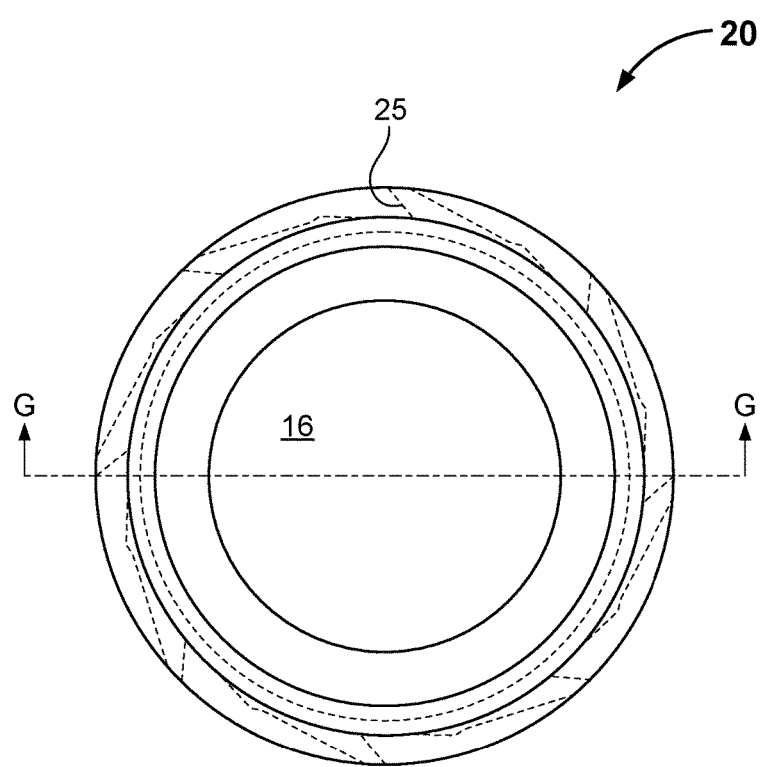
FIG. 26 is an end view of an inner member of a third embodiment of the thread protector of the present invention, showing preferred dimensions suitable for placement of this embodiment onto a 4.5 inch outside diameter tubular member (not shown)
Figure 27:
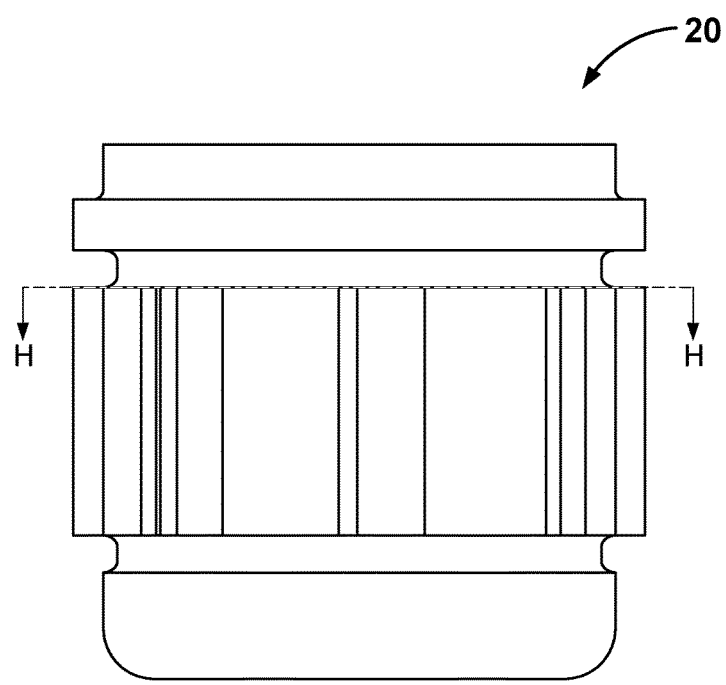
FIG. 27 is a side view of the inner member of the embodiment of FIG. 26.
Figure 28:
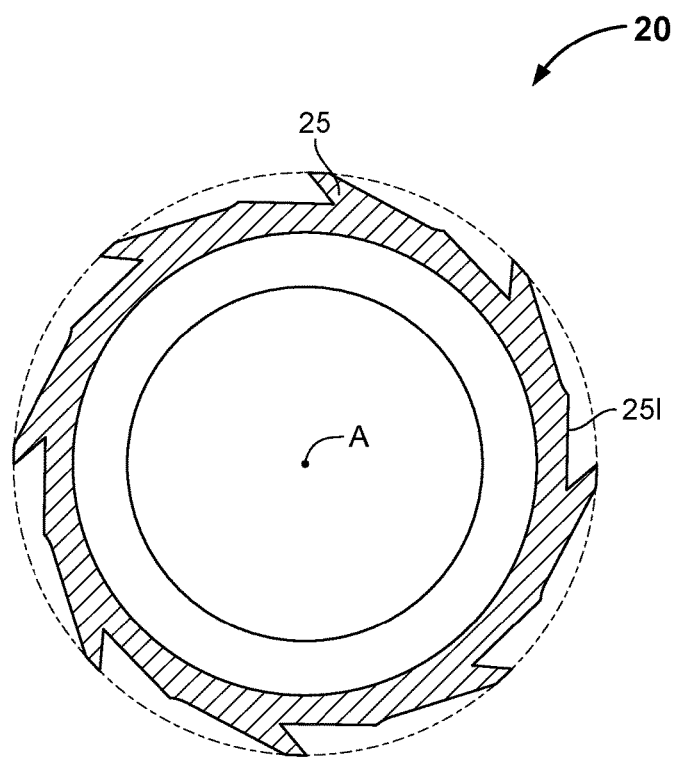
FIG. 28 is a sectioned view of the outer member of the embodiment of FIG. 26, taken along line H-H of FIG. 27.
Figure 29:
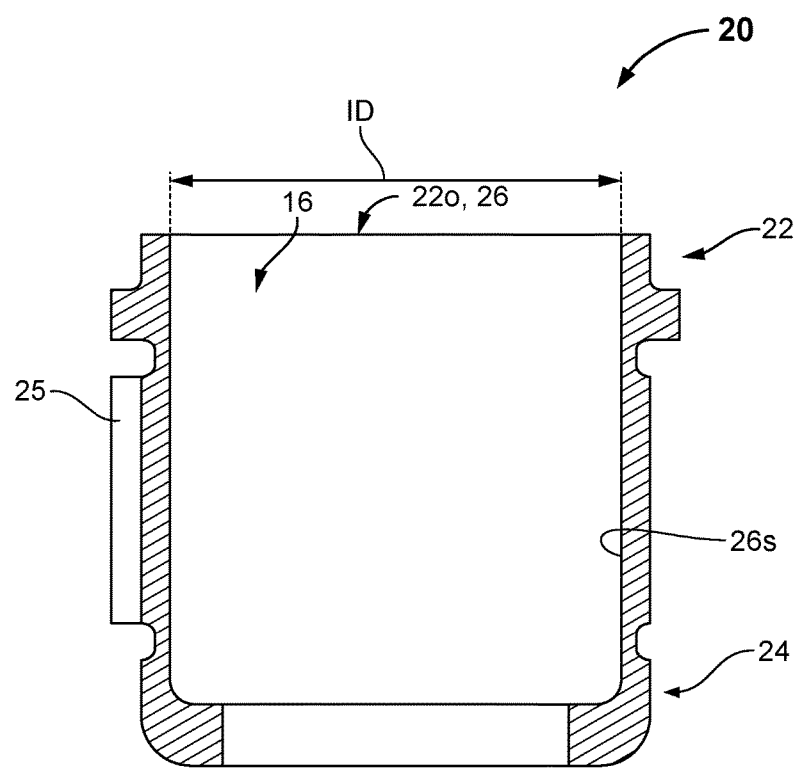
FIG. 29 is a sectioned view of the outer member of the embodiment of FIG. 26, taken along line G-G.

To facilitate the thread protector 10 actuating between a locked L and an unlocked U configuration, thread protector 10 preferably further comprises an inner member 20 and an outer member 30, coaxially arranged around axis A (see FIGS. 9, 20, and 21). Preferably inner member 20 and outer member 30 are each substantially hollow cylindrical members, or a generally annular sleeve-like members, as illustrated in the Figures.

Preferably inner member 20 and outer member 30 are made from a durable, non-corrosive and weather resistant material, such as polyurethane or rubber. More preferably, inner member 20 is flexible and bendable, so as to: (i) facilitate placement and/or removal of inner member 20 substantially into interior 36 of outer member 30 when assembling both members 20,30 into a thread protector 10 (see FIGS. 5 and 6), (ii) flex around and grip a threaded end TR of a tubular member when in the locked configuration (see FIG. 10), and (iii) enable changing the inside diameter ID of the opening 12o and interior 16—i.e. with the inside diameter ID' of the locked configuration flexing and decreasing D, thereby being smaller than the inside diameter ID of the unlocked configuration (see FIG. 12). Preferably, the outer member 30 has a urethane hardness that is greater than the urethane hardness of the inner member 20. A durometer (duro) hardness of 60 or 70 for the inside member 20 and a durometer (duro) hardness of 90 for the outside member 30 has been found to be suitable by the inventor.

Inner member 20 and outer member 30, along with opening 12o and interior 16, are coaxially aligned around a common axis A, so as to allow the thread protector 10 to fit around a threaded end TR when this axis A is substantially aligned with the longitudinal axis LA of a tubular member T (see FIGS. 9 and 10).

Preferably, inner member 20 has a first end 22 and second end 24 that substantially correspond to first end 12 and second end 14 of thread protector 10, when inner member 20 and outer member 30 are in the assembled state. More preferably, inner member 20 also has opening 22o that substantially corresponds to opening 12o of the thread protector 10, and has an interior 26 having a generally circular cross-section and an inside diameter 26id that substantially corresponds to interior 16 and inside diameter ID of the thread protector 10. That is, preferably, opening 22o and interior 26 of the inner member comprise the opening 12o and interior 16 of the thread protector 10.

A suitable inside diameter ID of the opening 12o,22o, when in the unlocked configuration U, will generally only be a few millimeters larger (1 to 5 mm) than the outside diameter OD of the tubular member T. For example, a thread protector 10 sized for a tubular member having a 4.5 inch outer diameter OD may have an inside member 20 with an opening 22o sized at 4.563 inches; see FIG. 29, which shows an embodiment of inside member 20 having an inside diameter ID of 4.563 inches, this being 0.063 inches or 1.6 mm larger than an OD of 4.5 inches.

With the inner member 20 being made of a flexible material (such as polyurethane), and having an opening 12o,22o dimensioned to only be a few millimeters larger than the outside diameter OD of a tubular member T, the thread protector 10 is able to slide over a threaded end TR and slightly engage said end TR with a small friction fit. Preferably, interior ridges 16r are provided on the interior surface 16s of the interior 16 (see FIG. 1), said ridges 16r configured to frictionally engage the threaded end TR and further maintain the inner member 20 frictionally engaged with said threaded end TR.

Figure 11:
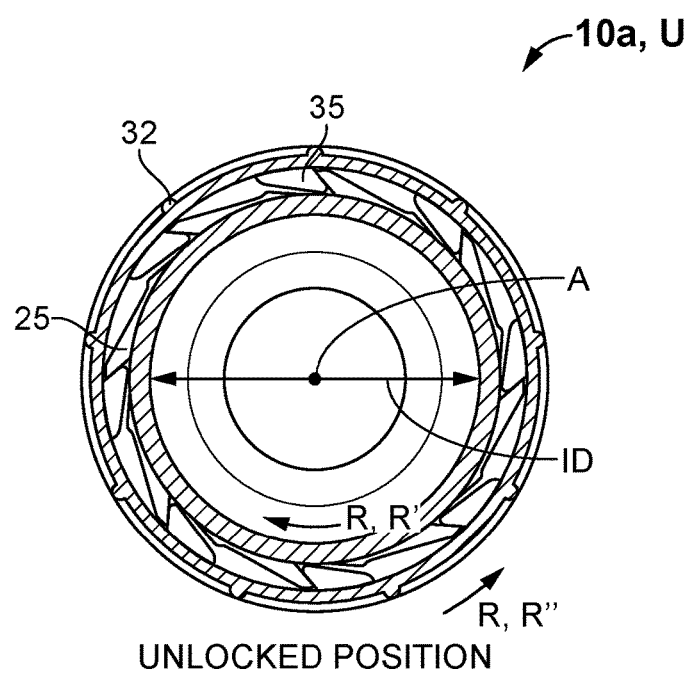
FIGS. 11 and 12 are sectioned end views of a second embodiment of the thread protector of the present invention, shown in an unlocked and locked position, respectively.

Inner and outer members 20, 30 are suitable to rotate R relative to each other, at least partially about axis A, with inner member rotating in one direction R' and the outer member rotating in the opposite direction R" (see FIGS. 11, 12 and 21). Preferably, a grease or other lubricant is provided between inner member 20 and outer member 30 to reduce any friction therebetween and facilitate easy rotation R of each member relative to the other. A white, non-staining, lithium, marine grease has been found to be suitable when the inner and outer members 20,30 are comprised of polyurethane. Grips 32 are preferably provided on the outside or exterior surface of the outer member 30 to facilitate a user or operator to manipulate the thread protector 10 and to rotate outer member 30 relative to the inner member, so as to actuate the thread protector 10 between the locked and unlocked configurations as desired.

Inner member 20 further comprises a plurality of external lugs 25 (on an exterior surface of the inner member 20), and outer member 30 further comprises a plurality of internal lugs 35 (on an interior surface of the outer member 30). Each set of lugs 25,35 preferably comprises generally opposite oriented slopes 25s,35s, to allow lugs 25 and 35 to engage each other and decrease/deflect D the inner member 20 so as to reduce that member's inside diameter ID', when the members are rotated R',R" relative to each other from the unlocked configuration to the locked configuration (see FIGS. 11 and 12).

Advantageously, when both inner and outer members 20,30 are made from polyurethane, by having an outside member 30 with a greater hardness than the inside member 20, any actuation of the thread protector 10 to the locked configuration, will cause the inner member 20 to decrease/deflect D first (with little or no deflection on the part of the outer member 30), thereby reducing that member's inside diameter ID' (see FIG. 12). It is also contemplated that the inner and outer member 20,30 may be made of any other suitable material which is weather resistant and wherein at least the inner member is flexible and bendable. Outer member 30 need not be flexible or bendable, but if it is, then preferably inner member 20 has a greater flexibility (than outer member 30), so as to decrease/deflect D first, when actuated to the locked configuration.

Preferably, the plurality of lugs 25,35 are provided in a substantially evenly spaced circumferential arrangement around the inner member's outside surface and around the outer member's inside surface (as generally shown in the Figures). More preferably the lugs 25,35 are shaped and dimensioned so as to provide zero deflection D of the inner member 20 when in the unlocked configuration (see FIG. 11) and maximal deflection D when in the locked configuration (see FIG. 12). A suitable amount of deflection D is substantially around ¼ inch, with each individual lug, in each cooperating, paired and engaged set of lugs 25,35, providing ⅛$^{th}$ of an inch of deflection (i.e. each lug projects from each member's surface by substantially around ⅛$^{th}$ of an inch). A suitable amount of paired sets of lugs 25,35, for a 4.5 inch outside diameter tubular member is eight paired sets, positioned evenly around each member's surface (as shown in the Figures). A greater, or smaller, set of paired lugs may be suitable for larger and smaller sized thread protectors.

As will now be clear to those skilled in the art, cooperating sets of sloped lugs 25 and 35, along with rotation R of the inner member 20 relative to the outer member 30, along axis A, actuates the thread protector 10 between the unlocked and locked configurations. A snug and slidable fit of the inner member 20 over a threaded end TR has been found to generally keep said inner member 20 frictionally engaged to said threaded end TR, and reduce or prevent any rotation of said inner member 20. A user may then apply a rotating force R" to the outside member 30 (e.g. via grips 32), thereby causing the inner and outer members 20,30 to rotate relative to each other.

More preferably, one of the sets of lugs (e.g. the lugs 25 on the inner member 20), may further comprise a lock indicator ridge or groove 251 to catch a free end of an opposing lug (e.g. 35e) when members 20 and 30 are fully rotated into the locked configuration. Engagement of the free end 35e with the lock indicator 251 will provide tactile and auditory feedback (e.g. a 'click') to a user that the thread protector is fully in the locked configuration.

Those of ordinary skill in the art will appreciate that various modifications to the invention as described herein will be possible without falling outside the scope of the invention. In the claims, the word "comprising" is used in its inclusive sense and does not exclude other elements being present. The indefinite article "a" before a claim feature does not exclude more than one of the features being present.

The embodiments of the invention in which an exclusive property or privilege is being claimed are defined as follows:

1. A thread protector for use with a threaded end of a tubular member, the threaded end having an outside diameter, the thread protector comprising:
    a first end having an opening with an inside diameter;
    a second end;
    an interior having an inside diameter that is substantially the same as the inside diameter of the opening, said interior adapted to accept and surround at least a portion of the threaded end;
    wherein the thread protector may be actuated between a locked configuration and an unlocked configuration;
    an inner member;
    an outer member;
    wherein each of the inner member and outer member are coaxially arranged around an axis; and
    wherein actuation of the thread protector, between the locked configuration and the unlocked configuration, is accomplished by rotating said inner and outer members relative to each other and about said axis;
    wherein, when the thread protector is in the locked configuration, at least a portion of the inside diameter of the interior is reduced so as to become smaller as compared to when the thread protector is in the unlocked configuration;
    and
    wherein, when the thread protector is in the locked configuration, the inside diameter of the interior is reduced so as to securely mount the tread protector to the threaded end.

2. The thread protector of claim 1 wherein, when the thread protector is in the locked configuration, the inside diameter of the interior is reduced by at least a quarter of an inch.

3. The thread protector of claim 1 wherein the inner member is made from a flexible material, so as to facilitate the reduction of the inside diameter when the thread protector is in the locked configuration.

4. The thread protector of claim 3 wherein both the inner member and outer member are made from polyurethane; and
   wherein a urethane hardness of the outside member is greater than a urethane hardness of the inside member.

5. The thread protector of claim 1 wherein the inner member further comprises a plurality of external lugs;
   wherein the outer member further comprises a plurality of internal lugs; and
   wherein each of said external lugs and internal lugs comprises generally opposite oriented slopes, so that when the thread protector is actuated from the unlocked configuration to the locked configuration, the external lugs and internal lugs engage each other, deflect the inner member and reduce the inner member's inside diameter.

6. The thread protector of claim 5 further comprising grips on the outside surface of the outer member.

7. The thread protector of claim 5 further comprising a lock indicator ridge on at least one of the external lugs or internal lugs.

\* \* \* \* \*